United States Patent

Kukino et al.

[11] Patent Number: 5,853,873
[45] Date of Patent: Dec. 29, 1998

[54] HARD COMPOSITE MATERIAL FOR TOOLS

[75] Inventors: Satoru Kukino; Mitsuhiro Goto; Tetsuo Nakai; Makoto Setoyama; Takashi Yoshioka, all of Hyogo, Japan

[73] Assignee: Sumitomo Electric Industries, Ltd, Osaka, Japan

[21] Appl. No.: 549,168

[22] Filed: Oct. 27, 1995

[30] Foreign Application Priority Data

Oct. 27, 1994 [JP] Japan .................................. 6-287374

[51] Int. Cl.$^6$ ...................................................... B24D 3/00
[52] U.S. Cl. .................. 428/336; 428/698; 428/697; 428/699; 428/408; 428/216; 428/704; 428/469
[58] Field of Search .................... 428/336, 408, 428/704, 698, 699, 697, 469, 702, 216, 701; 75/238; 51/293

[56] References Cited

U.S. PATENT DOCUMENTS

| | | | |
|---|---|---|---|
| 4,334,928 | 6/1982 | Hara et al. | 75/238 |
| 4,343,651 | 8/1982 | Yazu et al. | 75/238 |
| 4,447,263 | 5/1984 | Sugizawa et al. | 428/699 |
| 4,507,189 | 3/1985 | Doi et al. | 927/255.2 |
| 4,525,415 | 6/1985 | Poral | 428/216 |
| 4,540,596 | 9/1985 | Nimmagadda | 427/37 |
| 4,599,281 | 7/1986 | Schintlmeister | 428/469 |
| 4,714,660 | 12/1987 | Gates, Jr. | 428/698 |
| 4,753,854 | 6/1988 | Gavrilov et al. | 428/698 |
| 4,911,756 | 3/1990 | Nakai et al. | 75/238 |
| 5,092,920 | 3/1992 | Waka et al. | 75/238 |
| 5,139,537 | 8/1992 | Julien | 51/293 |
| 5,271,749 | 12/1993 | Rai et al. | 51/293 |
| 5,326,380 | 7/1994 | Yao et al. | 51/293 |

*Primary Examiner*—Archene Turner
*Attorney, Agent, or Firm*—Foley & Lardner

[57] ABSTRACT

Hard composite material for tools, comprising a substrate of CBN sintered body containing more than 20% by volume of cubic boron nitride or diamond sintered body containing more than 40% by volume of diamond. The substrate has at least one layer of hard heat-resisting film consisting mainly of Ti, Al and at least one element selected from a group comprising C, N and O on a portion or portions of said substrate where cutting participate. Improved in strength of base material, wear-resistance and oxidation-resistance, less reactive with iron and showing longer tool life comparing to known cutting tools and usable in wider applications such as hardened steel, cast ion and simultaneous cutting of cast ion and aluminum alloy.

22 Claims, 2 Drawing Sheets

HARD COMPOSITE MATERIAL FOR TOOLS

BACKGROUND OF THE INVENTION

1. Field of the Invention

The present invention relates to improvements in material for cutting tools, of sintered body consisting mainly of cubic boron nitride (hereinafter, CBN sintered body) and of sintered body consisting mainly of diamond (hereinafter, diamond sintered body), in particular to hard composite material improved in strength and wear-resistance.

2. Description of the Related Arts

Cubic boron nitride (CBN) is the hardest material next to diamond and is used in cutting tools due to low reactivity with metals. CBN sintered body is produced by sintering CBN powder with binder (sintering aid) and can be classified mainly into following three types:

1. CBN sintered body containing 20 to 80% by volume of CBN crystalline particles, binder being carbide, nitride or carbonitride of Ti (i.e. JP -A-53-77811).
2. CBN sintered body containing more than 70% by volume of CBN crystalline particles, binder being Al and Co metals (i.e. JP-B-52-43846).
3. CBN sintered body containing more than 95% by volume of CBN crystalline particles, binder being $M_3B_2N_4$ in which M is alkali earth metal (i.e. JP-A-59-57967).

These CBN sintered bodies possess very high hardness and thermal conductivity (or improved strength at high temperatures) and are used in cutting tools for a variety of steels. For example, the CBN sintered body of type (1) possesses Vickers hardness of 3,500 to 4,300 and shows improved wear-resistance and chipping-resistance and hence is used in cutting of high-hard cast iron or the like. CBN sintered body of the type (3) possesses Vickers hardness of 4,000 to 4,800 and shows high thermal conductivity and hence is used in bonding tools or the like. CBN sintered bodies, however, have disadvantages of cleavage and low resistance to oxidation, so that wear is inevitable in tools made of CBN sintered body alone due to insufficient resistance to wear when cutting work is effected on such materials that are difficult to be cut such as steel for transmission.

It is proposed to coating a surface of the CBN sintered body with a variety of wear-resisting layers so as to improve the wear-resistance of CBN sintered articles (i.e. JP-A-61-183187, JP-A-1-96083 and JP-A-1-96084). The hardness of known wear-resisting layers, however, are lower than that of CBN sintered body and hence wear is inevitable, so cutting tools made thereof can not be used in practical uses due to their short tool life. In particular, this coating shows no improvement in wear-resistance when hardened steels are machined because of fatally insufficient strength and hardness of the coating. It is also proposed to coating a surface of cemented carbide tool with TiN, (TiAl)N, TiCN, $Al_2O_3$ or the like. In this tool, however, the cemented carbide base deforms excessively plastically at high cutting temperature, resulting in that the coating layer easily peels off or is destroyed. Therefore, there is strong desire to improve the tool life when hard materials which are difficult to be machined such as hardened steel are used in cutting work.

Diamond sintered body is much harder than CBN sintered body. Diamond particle itself has little cleavage plane and little defects and particles strongly bond mutually so that diamond sintered body shows high transverse rupture strength and Young's modulus and hence is characterized by its very high strength. Known diamond sintered bodies available on the market, however, can not be used in actual cutting work for ferrous metals because of poor resistance to oxidation and very low wear-resistance. Therefore, actual application of diamond sintered body is limited to cutting work of nonferrous metal such as aluminum.

An object of the present invention is to provide an ideal hard composite material for tools possessing very high hardness and strength of CBN sintered body or diamond sintered body compared to cemented carbide and also superior high wear-resistance of hard heat-resisting film, so that its tool life is improved remarkably compared to known cutting tools when the tool is used in cutting work of hardened steels, rough cutting of cast iron, simultaneous cutting of cast iron and aluminum or the like.

SUMMARY OF THE INVENTION

The present invention provides a hard composite material for tools, comprising a substrate of CBN sintered body containing more than 20% by volume of cubic boron nitride (CBN) or diamond sintered body containing more than 40% by volume of diamond, characterized in that the substrate has at least one layer of hard heat-resisting film consisting mainly of Ti, Al and at least one element selected from a group comprising C, N and O and having a thickness of 0.5 to 15 μm on a portion or portions of the substrate where cutting occurs.

BRIEF DESCRIPTION OF DRAWINGS

FIG. 2 illustrates an embodiment of an apparatus for preparing the hard composite material according to the present invention.

Figure 1:
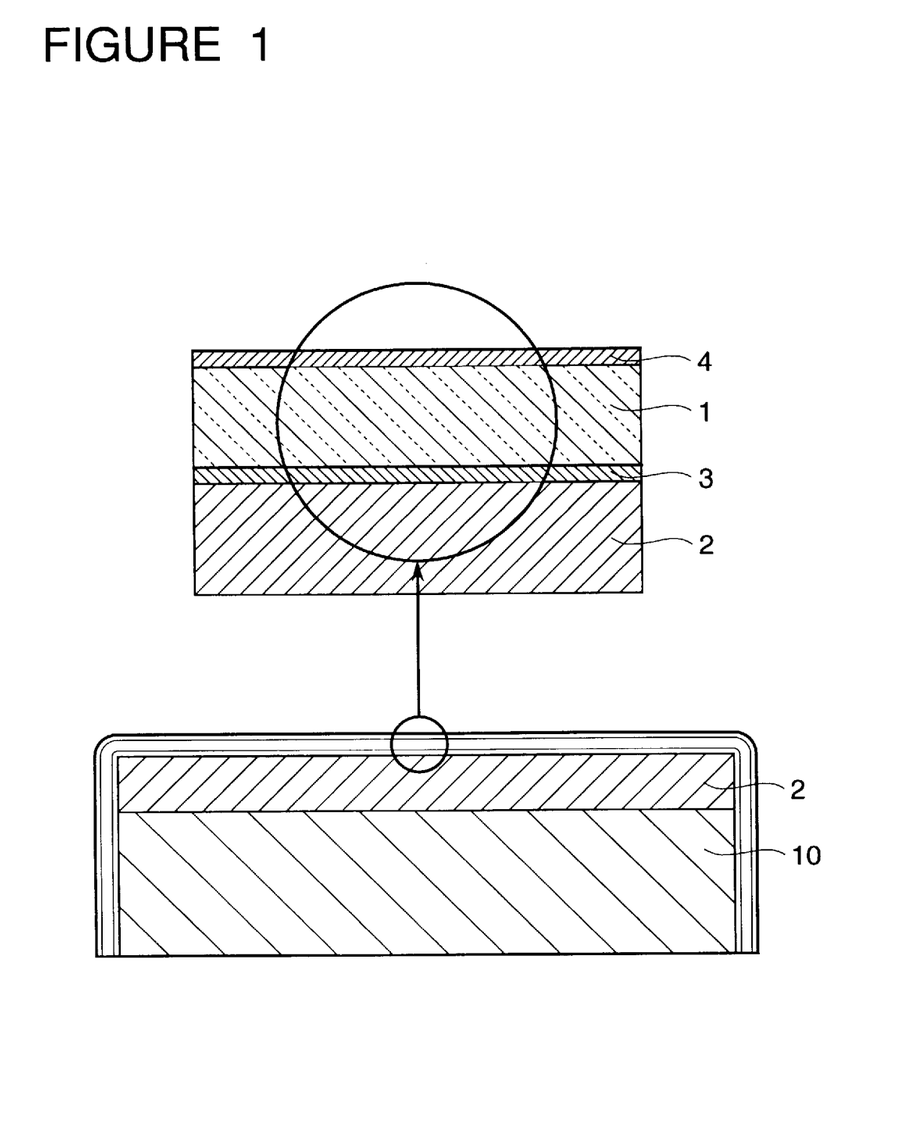
FIG. 1 is an illustrative cross sectional view of a hard composite material according to the present invention.

FIG. 1 illustrates a cross sectional view of a hard composite material for tools according to the present invention, comprising hard heat-resisting film (1) formed on a substrate (2). An intermediate layer (3) and a surface layer (4) can be formed optionally.

Figure 2A:
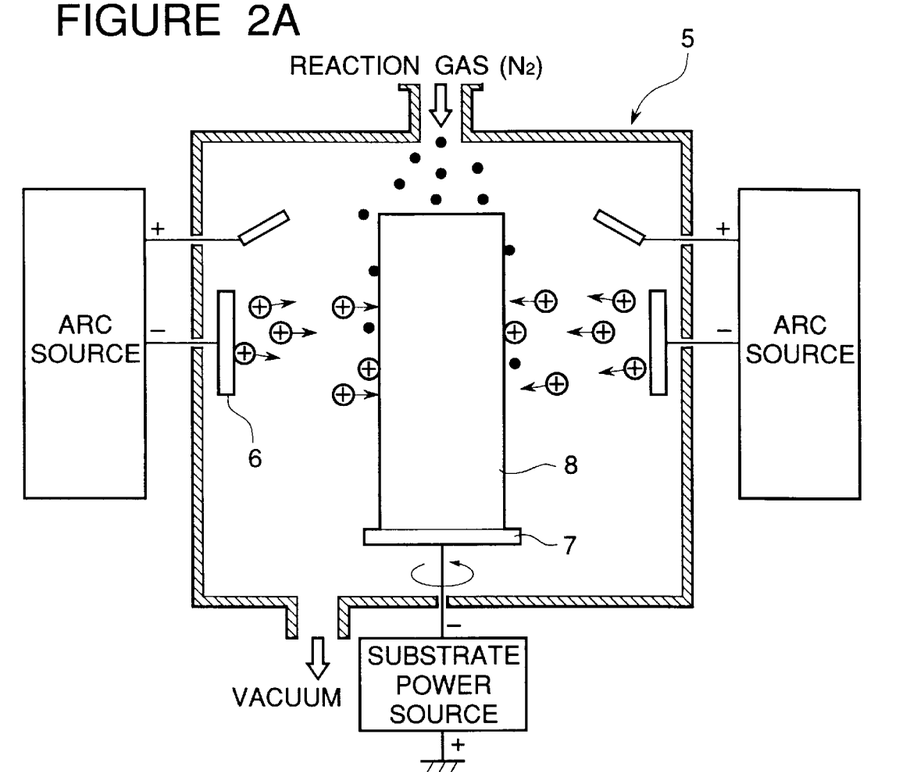
FIG. 2A is an illustrative cross section and FIG. 2B is an illustrative plane view.
Figure 2B:
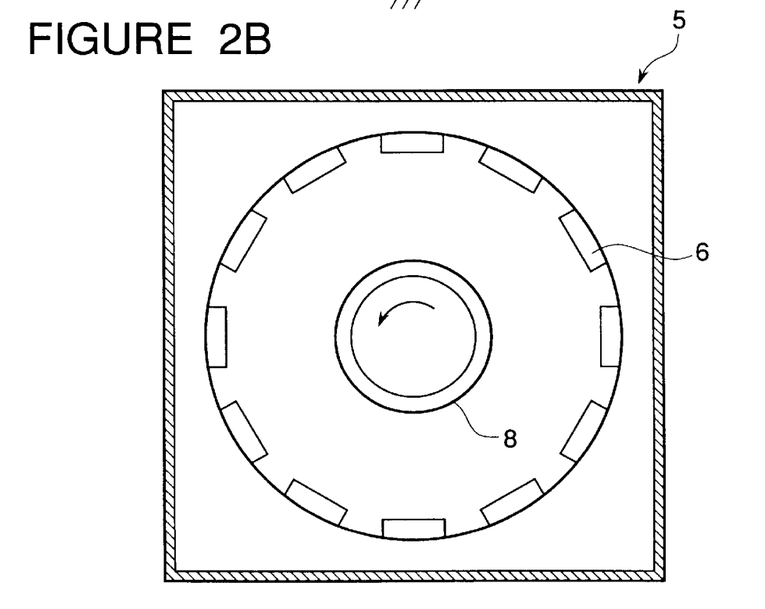

FIG. 2 is an illustrative view of an apparatus for producing the hard composite material according to the present invention. A plurality of substrates (8) (not shown separately) are held on a rotary holder (7) surrounded by a plurality of targets (6).

The hard heat-resisting film (1) can be prepared by physical vapour deposition (PVD) technique such as ion-plating which permits surface-treatment of substrate or tool without deteriorating its inherent high wear-resistance and chipping-resistance. The hard heat-resisting film according to the present invention can be produced advantageously by arc ion plating technique in which material elements are ionized at high efficiency and become very reactive. A film prepared by the arc ion plating technique possesses very strong adhesion to the substrate.

At least one intermediate layer (3) having a thickness of 0.05 to 5 μm is preferably interposed between the substrate (2) and the hard heat-resisting film (1). This intermediate layer (3) is preferably made of a material selected from a group comprising nitride, carbide and oxide of IVa, Va and VIa elements and their solid solutions. The intermediate layer (3) functions to increase adhesion between the hard heat-resisting film (1) and the substrate (2). Such intermediate layer is expected to reduce residual stress in the film deposited on a substrate which differs from the film in its property by assuring gradual control of its properties.

The hard heat-resisting film (1) can be produced by usual arc ion plating technique. The hard heat-resisting film shows improved hardness comparing to TiN film (Hv 322,800 for hard heat-resisting film, Hv=2,000 for TiN) and improved resistance to oxidation (oxidation initiation temperature of about 1,000° C. comparing to that of TiN: 700° C.). The present invention resides in such finding that a hard heat-resisting film deposited on CBN sintered article or diamond sintered article improves remarkably cutting performance, wear-resistance and chipping-resistance.

As stated above, coating layers of TiN, TiCN or $Al_2O_3$ have been studied for cemented carbide tools so as to increase wear-resistance and oxidation-resistance. On this line, these coatings were tried to be deposited on CBN sintered article and diamond sintered article but the results were not satisfactory.

Inventors found that the tool life (and hence wear-resistance, oxidation-resistance, reaction-resistance, chipping-resistance) is remarkably improved by using a coating consisting of Ti, Al and at least one element selected from a group comprising C, N and O. In particular a compound represented by the general formula:

$$(Ti_xAl_{1-x})\,N$$

in which $0.3 \leq x \leq 0.5$ can produce a film improved in properties (hardness and oxidation-resistance) and productivity.

TiAlN itself is known, however, the inventors have discovered that TiAlN improve oxidation-resistance without spoiling wear-resistance of hard CBN. A film of TiAlN containing C possesses higher hardness than TiAlN and a film of TiAlN containing O shows improved oxidation-resistance.

The hard heat-resisting film having a crystal structure of cubic system shows particularly improved hardness and does not spoil wear-resistance of CBN tools.

It is known that hardness of a thin film is influenced greatly by the hardness of the substrate and its influence become serious when the film becomes thinner so that the hardness finally approaches the hardness of the substrate. In the present invention, deformation of substrate which was a big problem in cemented carbide tools is prevented effectively by using CBN sintered substrate (Hv at room temperature is higher than 9,000) and diamond sintered substrate (Hv at room temperature =3,000 to 4,500) which possesses the first and second highest hardness among existing materials at room temperature and at elevated cutting temperature (higher than 800° C.), and the hard heat-resisting film according to the present invention keeps its high hardness under high cutting temperatures, so that the tool lives of CBN sintered body and diamond sintered body are remarkably improved. The hardness of the hard heat-resisting film further increases because deformation of the hard heat-resisting film according to the present invention is limited at an interface with the substrate because the film is prepared by ion plating technique which assures strong adhesion to the substrate.

In conclusion, by depositing the hard heat-resisting film according to the present invention on a portion or portions of the substrate where cutting occurs, two advantageous inherent properties of high hardness and high strength of CBN sintered body and of diamond sintered body and of high heat-resistance and oxidation-resistance of the hard heat-resisting film are realized in tools of CBN sintered body and of diamond sintered body and also wear-resistance and chipping-resistance are remarkably improved, resulting in greatly extended tool life.

The hard heat-resisting film according to the present invention can have a layered structure comprising more than two compounds or cyclic multi-layered structure. The hard heat-resisting film may have a gradient structure in which composition changes gradually from the substrate side to the film side. Gradient structure can be formed between the substrate and the intermediate layer of the hard heat-resisting film, between the intermediate layer and the hard heat-resisting film, between adjacent hard heat-resisting films, between the hard heat-resisting film and a surface layer. Such gradient structures are advantageously used to solve the problems of separation or crack of films.

If the total thickness of the hard heat-resisting film according to the present invention is not higher than 0.5 $\mu$m, no improvement in wear-resistance is observed. On the other hand, if the hard heat-resisting film has a thickness of more than 15 $\mu$m, adhesion to the substrate become lower due to an influence of residual stress in the hard heat-resisting film, and the advantage in hardness realized by the present invention is lost. Hardness of the hard heat-resisting film (Hv=2,800) becomes dominant so that satisfactory hardness can not be obtain, resulting in that wear-resistance is not improved. Therefore, the total thickness of the hard heat-resisting film is adjusted in a range of 0.5 to 15 $\mu$m.

Improvement in adhesion of the intermediate layer is not observed even if the thickness thereof is not higher than 0.05 $\mu$m and also exceeds 5 $\mu$m. Therefore, the thickness of the intermediate layer is preferably selected in a range between 0.05 and 5 $\mu$m from the view point of productivity. A surface or top layer (4) can be formed on the hard heat-resisting film. The thickness of this top layer (4) is preferably less than 5 $\mu$m. Improvement in wear-resistance and chipping-resistance is not expected over 5 $\mu$m because such thick surface layer peels off and is not desirable from the view point of productivity.

The super hard composite material according to the present invention is shaped or machined into and advantageously used as cutting tools such as tip, drills and end mills. It is confirmed that tools produced from the hard heat-resisting composite material according to the present invention show surprisingly superior cutting performance and long lives.

CBN sintered substrate can be selected from following three types of CBN sintered bodies (1) to (3):

(1) CBN sintered body obtained by sintering at high-pressure 30 to 90% by volume of cubic boron nitride (CBN) powder and a binder powder of balance comprising at least one member selected from a group comprising nitride, carbide, boride and oxide of IVa, Va and VIa elements and their solid solutions and aluminum and/or aluminium compound, and inevitable impurities.

In this type CBN sintered body, the binder consist preferably of 50 to 95% by weight of at least one member selected from a group comprising TiC, TiN, TiCN, (TiM)C, (TiM)N and (TiM)CN in which M is a transition metal selected from IVa, Va nd VIa elements except Ti and 5 to 50% by weight of aluminum and/or aluminium compound.

(2) CBN sintered body obtained by high-pressure sintering of 40 to 95% by volume of cubic boron nitride (CBN) powder and a binder powder of balance comprising 1 to 50% by weight of TiN, at least one member selected from a group comprising Co, Ni and WC, aluminum and/or aluminum compound and inevitable impurities.

(3) CBN sintered body obtained by high-pressure sintering of more than 90% by volume of cubic boron nitride (CBN) powder and a binder powder of balance comprising boride of Ia or IIa elements, TiN and inevitable impurities. The binder contains preferably 1 to 50% by weight of TiN.

CBN sintered body of the type (1) itself is known and its properties and its production method are described in details in the JP-A-53-77811.

CBN sintered body of the type (2) can be prepared by adding TiN to a binder disclosed in the JP-B-52-43846. Addition of TiN increase adhesion to the hard heat-resisting film of the present invention.

CBN sintered body of the type (3) can be prepared by adding TiN to a binder disclosed in the JP-A-59-57967. Addition of TiN increase adhesion to the hard heat-resisting film in this case also.

In the CBN sintered body of the type (1), the binder consists of at least one member selected from a group comprising nitride, carbide, boride and oxide of IVa, Va and VIa elements and their solid solutions and 5 to 50% by weight of aluminium and/or aluminium compound and react with CBN at high temperature and pressure during sintering stage to produce such compounds as aluminum boride ($AlB_2$), aluminum nitride (AlN) or the like at an interface or boundary between CBN particle and the binder, which increases bonding force among particles and improves toughness and strength of the sintered body. When TiC and/or TiN is used as the binder, the values of "z" in $TiN_z$ and $TiC_z$ are shifted to stoichiometric excess such as $0.5 \leq z \leq 0.85$ and $0.65 \leq z \leq 0.85$ respectively to increase free titanium which promote reaction of binder to the CBN. In fact, wear-resistance and strength of the resulting CBN sintered body is improved by the such reaction products as $AlB_2$, AlN and $TiB_2$. If the values of "x" are not higher than 0.5 and 0.65 respectively, packaging of powder become difficult due to exothermic oxidation reaction. On the contrary, no substantial improvement in reactivity between CBN and the binder is expected even if the values of "x" exceed 0.85.

In the cases when $TiN_z$ ($0.5 \leq z \leq 0.85$) and $TiC_z$ ($0.65 \leq z \leq 0.85$) are used as binder in the CBN sintered body of the type (1), if a proportion of aluminum and/or aluminium compound is not higher than 0.5% by weight, satisfactory reaction between CBN and aluminum and/or aluminium compound does not occur so that CBN powder is not bonded coagulated enough. On the other hand, if the contents exceeds over 40% by weight, a proportion of CBN which has higher hardness and mechanical strength than $AlB_2$ and AlN decreases, resulting in that wear-resistance drop sharply. From this reason, in the prior arts, when CBN sintered body of the type (1) was used for producing tools, it was believed that proportion of 60 to 95% by weight of TiCz ($0.5 \leq z \leq 0.85$) and/or TiNz ($0.65 \leq z \leq 0.85$) and 5 to 40% by weight of aluminum and/or aluminium compound was mostly preferable.

However, in the hard composite material for tools according to the present invention, relatively low wear-resistance which is a weak point of CBN sintered body can be covered by the hard heat-resisting film possessing improved in hardness and oxidation-resistance. Therefore, in the CBN sintered body used in the present invention for producing the hard composite material for tools, toughness and strength are much better than wear-resistance. In other words, it means that such a material that could not be used as a base for cutting tools in cutting work of hard metals which are difficult to be machined because of poor wear-resistance although it possesses enough toughness can be used in the present invention. For example, a CBN sintered body containing excess amount of aluminum and/or aluminum compound in binder powder will be an ideal base material for hard composite material for tools possessing chipping-resistance and wear-resistance when a coating of the hard heat-resisting film according to the present invention is deposited.

In the CBN sintered body of the type (1), the above-mentioned advantage can be realized clearly in particular when, as binder powder, 50 to 80% by weight of $TiN_z$ ($0.5 \leq z \leq 0.85$), 15 to 50% by weight of aluminum and/or aluminium compound and inevitable impurities are used, the CBN sintered body thereby obtained having the transverse rupture strength determined according to JIS standard of higher than 110 kgf/mm$^2$ and when, as binder powder, 50 to 80% by weight of $TiC_z$ ($0.5 \leq z \leq 0.85$), 15 to 50% by weight of aluminum and/or aluminium compound and inevitable impurities, and the CBN sintered body thereby obtained having the transverse rupture strength determined according to JIS standard of higher than 105 kgf/mm$^2$. In fact, satisfactory long tool lives which are acceptable in actual use can be realized in interrupting hard cutting work of hardened hard steel to which the conventional CBN sintered tools or known CBN tools coated with wear-resisting coating could not be used.

When TiCz ($0.5 \leq z \leq 0.85$) and/or TiNz ($0.65 \leq z \leq 0.85$) is used as binder, a proportion of aluminum and/or aluminium compound must be lower than 50% by weight, otherwise the resulting CBN sintered body possesses insufficient hardness and strength that can not be used as a substrate for composite material for tools.

In the case of CBN sintered body of type (2), CBN powder has preferably an average particle size of less than 3 μm so as to produce CBN sintered body having the transverse rupture strength determined according to JIS standard of higher than 105 kgf/mm$^2$. The CBN sintered body coated with the hard heat-resisting film according to the present invention can be used in the interrupting hard cutting work of hardened hard steel to which the conventional CBN sintered tools or known CBN tools coated with wear-resisting coating could not be used and satisfactory long tool life which is acceptable in actual use is obtained.

The diamond sintered body is preferably selected from following three types;

(1) a sintered body containing 50 to 98% by volume of diamond powder, binder powder of balance preferably comprising iron group metal, WC and inevitable impurities. The iron group metal is preferably Co.

(2) a sintered article containing of 60 to 95% by volume of diamond powder, binder powder of balance preferably comprising iron group metal, at least one member selected from a group comprising carbide and carbonitride of IVa, Va nd VIa element, WC and inevitable impurities. The iron group metal is preferably Co and the sintered body preferably contain TiC and WC.

(3) a sintered article containing of 60 to 98% by volume of diamond powder, binder powder of balance preferably comprising silicon carbide, silicon, WC and inevitable impurities.

The diamond sintered bodies which show particularly high strength among known diamond sintered articles contain an iron group metal or at least one member selected from a group comprising carbide, carbonitride of IVa, Va nd VIa element, silicon carbide and silicon which function to assure hard bonding between the substrate and the hard heat-resisting film.

In the case of diamond sintered body also, a sintered body having the transverse rupture strength (determined according to JIS standard) of higher than 150 kgf/mm$^2$ and being coated with the hard heat-resisting film according to the present invention can be used in the interrupting hard cutting work of hardened hard steel to which the conventional CBN sintered tools or known CBN tools coated with wear-resisting coating could not be used and satisfactory long tool life which is acceptable in actual use is obtained.

The present invention provides a hard composite material for tools improved in strength, tenacity and wear-resistance by depositing a hard heat-resisting film on a CBN sintered body or diamond sintered body which possesses very high strength, hardness and tenacity, so that tools prepared from the material show very long tool life comparing to known cutting tools and can be used in wider applications.

DESCRIPTION OF PREFERRED EMBODIMENT

The present invention will be described in more details with referring to Examples but the present invention is not limited to these Examples.

Example 1

Powder of TiN and powder of AlN were mixed at a ratio of 80:20 by weight in a pot made of cemented carbide alloy containing balls of the same material to obtain a binder powder. The binder powder was mixed with CBN powder at a ratio of 40:60 by volume and the resulting powder mixture was packed in a Mo container and sintered at 1,450° C. under a pressure of 50 kb for 20 minutes. The resulting sintered article was shaped into a tip for cutting tool (shape of SNGN 120408) and a hard heat-resisting film was deposited on portions of the tip where cutting occurs by ion-plating technique in vacuum arc-discharge.

In operation, a plurality of targets were set in a vacuum chamber as is shown in FIG. 2 and a plurality of tips were secured on a tip holder arranged at the center of the targets. The targets are made of TiAl. After the vacuum chamber was evacuated to a pressure of $10^{-5}$ Torr, argon (Ar) gas was introduced to create a pressure of $10^{-2}$ Torr in which the tips were cleaned at a voltage of −1,000 V. Then, the tips were heated to 500° C. and argon gas was evacuated. After this, nitrogen ($N_2$) gas as reaction gas was introduced at a rate of 300 cc/min and a voltage of −200 V was applied to the tips while the tip holder was rotated, so that the targets of TiAl were vaporized and ionized in arc discharge with arc current of 100 A so that a thin films of was deposited on the tips. Total thickness of the film was controlled by deposition time duration.

In case films containing C or O, $N_2$, $C_2H_2$ and $O_2$ gases were used as reaction gas. Proportions of C, N and O were controlled by adjusting flow rates of respective gases. Intermediate layer and surface layer were prepared by the same method as above but the TiAl target was replaced by Ti target.

For comparison, the conventional coating films were deposited on the same tip (sample No , 1–29 to 1–33). Sample Nos. 1–29 to 1–32 are comparative examples of cutting tips having the conventional coating layers having hard coat layer consisting of TiCN layer and TiN layer prepared on the same tip as Example 1 by ion-plating technique under vacuum arc discharge in usual film forming machine. Sample No. 1–33 has a hard coat consisting of TiN layer and $Al_2O_3$ layer prepared on the same tip as Example 1 by usual CVD technique.

The resulting tips was evaluated by cutting test in which a round steel rod (SUJ2) having a hardness of HRC63 was cut along its periphery at a cutting speed of 100 m/min, a depth of cut of 0.2 mm, a feed of 0.1 mm per revolution and for 40 minutes in a dry condition. Results are summarized in Table 1.

TABLE 1

| sample No | intermediate layer (3) composition | ($\mu$m) | hard heat-resisting film (1) composition | thickness ($\mu$m) | crystal structure | surface layer (4) ($\mu$m) | flank wear (mm) | mark |
|---|---|---|---|---|---|---|---|---|
| 1-1 | none | | $(Ti_{0.1},Al_{0.9})N$ | 3.5 | hexagonal | none | 0.130 | bad |
| 1-2 | none | | $(Ti_{0.3},Al_{0.7})N$ | 3.5 | cubic | none | 0.112 | good |
| 1-3 | none | | $(Ti_{0.5},Al_{0.5})N$ | 3.5 | cubic | none | 0.114 | good |
| 1-4 | none | | $(Ti_{0.7},Al_{0.3})N$ | 3.5 | cubic | none | 0.120 | not good |
| 1-5 | none | | $(Ti_{0.9},Al_{0.1})N$ | 3.5 | cubic | none | 0.130 | bad |
| 1-6 | TiN | 0.5 | $(Ti_{0.3},Al_{0.7})C$ | 3.5 | cubic | a) | 0.105 | v. good |
| 1-7 | TiN | 0.5 | $(Ti_{0.25},Al_{0.75})(C_{0.1},N_{0.9})$ | 3.0 | hexagonal | a)0.2 | 0.121 | not good |
| 1-8 | TiN | 0.5 | $(Ti_{0.4},Al_{0.6})(C_{0.15},N_{0.75}O_{0.1})$ | 4.2 | cubic | a)0.2 | 0.108 | v. good |
| 1-9 | TiN | 0.5 | $(Ti_{0.3},Al_{0.7})N$ | 5.6 | cubic | a)0.2 | 0.106 | v. good |
| 1-10 | TiN | 0.5 | $(Ti_{0.4},Al_{0.6})(N_{0.85},O_{0.15})$ | 2.8 | cubic | a)0.2 | 0.107 | v. good |
| 1-11 | TiN | 0.3 | $(Ti_{0.3},Al_{0.7})(C_{0.2},N_{0.8})$ | 0.2 | cubic | none | 0.123 | not good |
| 1-12 | TiN | 0.3 | $(Ti_{0.3},Al_{0.7})(C_{0.2},N_{0.8})$ | 0.5 | cubic | none | 0.111 | good |
| 1-13 | TiN | 0.3 | $(Ti_{0.3},Al_{0.7})(C_{0.2},N_{0.8})$ | 1.0 | cubic | none | 0.109 | v. good |
| 1-14 | TiN | 0.3 | $(Ti_{0.3},Al_{0.7})(C_{0.2},N_{0.8})$ | 4.1 | cubic | none | 0.108 | v. good |
| 1-15 | TiN | 0.3 | $(Ti_{0.3},Al_{0.7})(C_{0.2},N_{0.8})$ | 6.5 | cubic | none | 0.109 | v. good |
| 1-16 | TiN | 0.3 | $(Ti_{0.3},Al_{0.7})(C_{0.2},N_{0.8})$ | 10.0 | cubic | none | 0.108 | v. good |
| 1-17 | TiN | 0.3 | $(Ti_{0.3},Al_{0.7})(C_{0.2},N_{0.8})$ | 15.0 | cubic | none | 0.109 | v. good |
| 1-18 | TiN | 0.3 | $(Ti_{0.3},Al_{0.7})(C_{0.2},N_{0.8})$ | 18.0 | cubic | none | 0.122 | not good |
| 1-19 | TiN | 0.01 | $(Ti_{0.3},Al_{0.7})(N_{0.9},O_{0.1})$ | 2.5 | cubic | none | 0.112 | good |
| 1-20 | TiN | 0.05 | $(Ti_{0.3},Al_{0.7})(N_{0.9},O_{0.1})$ | 2.5 | cubic | none | 0.105 | v. good |
| 1-21 | TiN | 1.0 | $(Ti_{0.3},Al_{0.7})(N_{0.9},O_{0.1})$ | 2.5 | cubic | none | 0.106 | v. good |
| 1-22 | TiN | 5.0 | $(Ti_{0.3},Al_{0.7})(N_{0.9},O_{0.1})$ | 2.5 | cubic | none | 0.105 | v. good |
| 1-23 | TiN | 7.0 | $(Ti_{0.3},Al_{0.7})(N_{0.9},O_{0.1})$ | 2.5 | cubic | none | 0.121 | not good |
| 1-24 | TiN | 0.4 | $(Ti_{0.5},Al_{0.5})N$ | 3.3 | cubic | a)0.01 | 0.107 | v. good |
| 1-25 | TiN | 0.4 | $(Ti_{0.5},Al_{0.5})N$ | 3.3 | cubic | a)0.05 | 0.105 | v. good |
| 1-26 | TiN | 0.4 | $(Ti_{0.5},Al_{0.5})N$ | 3.3 | cubic | a)1.0 | 0.106 | v. good |
| 1-27 | TiN | 0.4 | $(Ti_{0.5},Al_{0.5})N$ | 3.3 | cubic | a)5.0 | 0.107 | v. good |
| 1-28 | TiN | 0.4 | $(Ti_{0.5},Al_{0.5})N$ | 3.3 | cubic | a)7.0 | 0.120 | not good |
| 1-29 | TiN | 0.4 | compsite layer[c] | 7.0 | cubic | none | 0.108 | v. good |

TABLE 1-continued

| sample No | intermediate layer (3) composition | ($\mu$m) | hard heat-resisting film (1) composition | thickness ($\mu$m) | crystal structure | surface layer (4) ($\mu$m) | flank wear (mm) | mark |
|---|---|---|---|---|---|---|---|---|
| 1-30 | TiN | 0.5 | TiCN | 2.8 | cubic | b)0.5 | 0.120 | not good |
| 1-31 | none | | TiN | 3.1 | cubic | none | 0.127 | not good |
| 1-32 | TiN | 0.5 | TiC | 3.2 | cubic | none | 0.121 | not good |
| 1-33d) | none | | $Al_2O_3$ | 5.2 | hexagonal | b)0.5 | 0.125 | not good | a)$Ti(C_{0.5},N_{0.5})$: 0.2 $\mu$m
a)$Ti(C_{0.5},N_{0.5})$
b)TiN
c)$(Ti_{0.3},Al_{0.7})N/(Ti_{0.3},Al_{0.7})C/(Ti_{0.3},Al_{0.79})(C_{0.3},N_{0.7})$
   2 $\mu$m     1 $\mu$m     2 $\mu$m     2 $\mu$m
d)prepared by CVD (the other samples were prepared by PVD)

Example 2

Procedure of Example 1 was repeated but the content (vol %) of CBN in the substrate and compositions of binder (% by weight) were changed to Table 2.

X-ray diffraction patterns of the resulting sintered articles revealed existence of inevitable contaminations which were thought to be $\alpha$-$Al_2O_3$, WC and Co.

The resulting CBN sintered body was shaped into a tip for cutting tool and an intermediate layer of TiN having a thickness of 0.5 $\mu$m was deposited on portions of the tip where cutting occurs by usual PVD technique in the same apparatus as Example 1 and then a hard heat-resisting film of ($Ti_{0.3}$ $Al_{0.7}$) N was deposited at a total thickness of 5.6 $\mu$m. Finally, a top layer of Ti ($C_{0.5}$ $N_{05}$) was deposited to a thickness of 0.2 $\mu$m.

Cutting test was effected on the resulting cutting tips and comparative tips having no hard heat-resisting layer according to the present invention. Results are summarized in Table 2.

Time until damage in Table 2 is time duration until the tool was damaged (min) which was determined when a round steel rod of hardened SKD 11 of HRC hardness 56 having four U-grooves on its periphery was cut at a cutting speed of 100 m/min, a depth of cut of 0.2 mm, a feed of 0.1 mm per revolution in a dry condition.

TABLE 2

| Sample No | CBN (vol\|%) | composition of binder | substances in sintered body identified by X-ray diffraction | rupture strength of CBN substrate (kgf/mm$^2$) | time until damage (min) |
|---|---|---|---|---|---|
| 2-1 | 97 | 80: $Ca_3B_2N_4$ 20: TiN | TiN | 70 | *3 5 |
| 2-2 | 96 | 80: TiN 20: Al | CBN, TiN, AlN, $AlB_2$, $TiB_2$ | 60 | *2 5 |
| 2-3 | 96 | 55: Co 30: Al 13: WC 2: TiN | CBN, CoWB, $Co_{21}W_2B$, AlN | 75 | *4 9 |
| 2-4 | 92 | 55: Co 30: Al 13: WC 2: TiN | CBN, CoWB, $Co_{21}W_2B$, AlN | 85 | *4 16 |
| 2-5 | 87 | 60: TiN 40: Al | CBN, TiN, AlN, $AlB_2$, $TiB_2$ | 95 | *10 20 |
| 2-6 | 85 | 75: TiCN 15: Al, 10: WC | CBN, TiCN, AlN, WC, $TiB_2$ | 90 | *9 15 |
| 2-7 | 85[1] | 55: Co 30: Al 13: WC 2: TiN | CBN, CoWB, $Co_{21}W_2B$, AlN | 105 | *6 31 |
| 2-8 | 85[2] | 55: Co 30: Al 13: WC 2: TiN | CBN, CoWB, $Co_{21}W_2B$, AlN | 95 | *5 23 |
| 2-9 | 70 | 70: (TiHf)N 30: Al | CBN, (TiHf)N, AlN, $AlB_2$, $TiB_2$ | 105 | *12 27 |
| 2-10 | 70 | 70: (TiHf)C 30: $TiAl_3$ | CBN, (TiHf)C, AlN, $AlB_2$, $TiB_2$ | 105 | *11 21 |
| 2-11 | 65 | 65: TiN 25: Al 5: VN 5: HfC | CBN, TiN, VN, HfC, AlN, $TiB_2$ | 100 | *14 21 |
| 2-12 | 60 | 100: $Al_2O_3$ | CBN, $Al_2O_3$ | 70 | *0.5 1 |
| 2-13 | 55 | 90: $TiN_{0.7}$ 10: Al | CBN, TiN, AlN, $AlB_2$, $TiB_2$ | 90 | *11 19 |
| 2-14 | 55 | 70: $TiN_{0.7}$ 30: Al | CBN, TiN, AlN, $AlB_2$, $TiB_2$ | 120 | *10 39 |
| 2-15 | 55 | 50: $TiN_{0.7}$ 50: Al | CBN, TiN, AlN, $AlB_2$, $TiB_2$ | 95 | *9 25 |
| 2-16 | 55 | 40: $TiN_{0.7}$ 60: Al | CBN, TiN, AlN, $AlB_2$, $TiB_2$ | 80 | *6 13 |
| 2-17 | 55 | 75: $TiN_{0.7}$ 25: Al | CBN, TiN, AlN, $AlB_2$, $TiB_2$ | 110 | *16 30 |
| 2-18 | 55 | 75: $TiN_{0.9}$ 25: Al | CBN, TiN, AlN, $AlB_2$, $TiB_2$ | 105 | *15 22 |

TABLE 2-continued

| Sample No | CBN (vol%) | composition of binder | substances in sintered body identified by X-ray diffraction | rupture strength of CBN substrate (kgf/mm²) | time until damage (min) |
|---|---|---|---|---|---|
| 2-19 | 55 | 75: TiN  25: Al | CBN, TiN, AlN, AlB$_2$, TiB$_2$ | 105 | *14  23 |
| 2-20 | 55 | 60: TiC$_{0.8}$  40: TiAl$_3$ | CBN, TiC, AlN, AlB$_2$, TiB$_2$ | 105 | *9  21 |
| 2-21 | 55 | 60: TiC$_{0.95}$  40: TiAl$_3$ | CBN, TiC, AlN, AlB$_2$, TiB$_2$ | 90 | *6  16 |
| 2-22 | 55 | 60: TiC  40: TiAl$_3$ | CBN, TiC, AlN, AlB$_2$, TiB$_2$ | 90 | *7  15 |
| 2-23 | 45 | 55: Co 30: Al  13: WC 12: TiN | CBN, CoWB, AlN, Co$_{21}$W$_2$B, AlB$_2$ | 90 | *4  21 |
| 2-24 | 35 | 55: Co 30: Al  13: WC 12: TiN | CBN, CoWB, AlN, Co$_{21}$W$_2$B, AlB$_2$ | 85 | *3  11 |
| 2-25 | 34 | 60: TiN  40: Al | CBN, TiN, AlB$_2$, TiB$_2$ | 90 | *11  20 |
| 2-26 | 20 | 60: TiN  40: Al | CBN, TiN, AlB$_2$, TiB$_2$ | 80 | *7  11 |

Note
*Comparative: tool having no hard heat-resiting film of the present invention
$^{1)}$average particle size = 3 μm
$^{2)}$average particle size = 5 μm Example 3

Procedure of Example 1 was repeated but the CBN sintered bodies were replaced by diamond sintered bodies having the content (vol %) of diamond and compositions of binder (% by weight) shown in Table 3.

A disk of Co was placed on a bottom of a Mo container in which the powder mixture was then packed. The resulting assembly was sintered at 1,450° C. under a pressure of 55 kb for 20 min.

The resulting diamond sintered body was shaped into a tip for cutting tool and, on portions of the tip where cutting occurs, the same intermediate layer (TiN; 0.5 μm), hard heat-resisting film [(Ti$_{0.3}$Al$_{0.7}$)N; 5.6 μm ] and top layer of [Ti (C$_{0.5}$ N$_{0.5}$); 0.2 μm] were deposited by the same ion plating technique as Example 1.

Cutting test was effected on the resulting cutting tips and comparative tips. A comparative tip is CBN sintered body used in Example 1 having no hard heat-resisting layer according to the present invention and the other comparative tips are diamond sintered bodies having no hard heat-resisting layer according to the present invention. In the test, wear-resistance of the tips was determined on a combined round steel rod consisting of FCD 600 steel and 16% Si-Al alloy (cutting ratio=1:1) which was cut along its periphery at a cutting speed of 200 m/min, a depth of cut of 0.3 mm, a feed of 0.2 mm per revolution and for 20 minutes in a dry condition to measure a flank wear width (mm). Results are summarized in Table 3.

TABLE 3

| Sample No | content of diamond (vol %) | composition of other components in sintered body | flank wear (mm) |
|---|---|---|---|
| 3-1 | 99 | Co, W | *broken after 3 min  broken after 4 min |
| 3-2 | 98 | Co, WC | *0.213  0.165 |
| 3-3 | 90 | Co, WC | *0.160  0.119 |
| 3-4 | 90 | TiN, Co WC | *0.150  0.111 |
| 3-5 | 85 | TiC, HfC, Co | *0.155  0.132 |
| 3-6 | 80 | Co, Ni, TiC | *0.159  0.129 |
| 3-7 | 75 | SiC, Si, WC | *0.240  0.182 |
| 3-8 | 70 | TiN, Co, N, WC | *0.166  0.129 |
| 3-9 | 70 | Al, Al$_2$O$_3$ | *broken after 3 min  broken after 5 min |
| 3-10 | 45 | TiC, Co, WC | *0.185  0.149 |
| 3-11 | 35 | TiN, Co | *broken after 2 min  broken after 7 min |
| 3-12 | CBN sintered body |  | *broken after 4 min  0.116 |

(note)
*: tools having no hard heat-resisting film of the invention

We claim:

1. Hard composite material for cutting tools, comprising a substrate and at least one layer of hard heat-resisting film on cutting portions of said substrate, wherein said substrate is one of:
  (a) a cubic boron nitride sintered body containing more than 20% by volume of cubic boron nitride, and
  (b) a diamond sintered body containing more than 40% by volume of diamond,
and wherein said hard heat-resisting film consists mainly of Ti, Al and at least one element selected from a group comprising C, N and O.

2. The composite material set forth in claim 1, wherein said hard heat-resisting film has a crystal structure of cubic system.

3. The composite material set forth in claim 1, wherein said hard heat-resisting film is made of a compound represented by the general formula:

$$(Ti_xAl_{1-x})N$$

in which $0.3 \leq x \geq 0.5$.

4. The composite material set forth in claim 1, wherein said hard heat-resisting film has a thickness of 0.5 to 15 μm.

5. The composite material set forth in claim 1, additionally comprising an intermediate layer between said substrate and said hard heat-resisting film that has a thickness of 0.05 to 5 μm and is made of at least one compound of at least one element selected from a group comprising IVa, Va and VIa elements and at least one element selected from a group comprising C, N and O.

6. The composite materials et forth in claim 1, additionally comprising a surface layer deposited on an outer surface of said hard heat-resisting film that has a thickness of 0.05 to 5 μm and is made of at least one compound of at least one element selected from a group comprising IVa, Va and VIa elements and at least one element selected from a group comprising C, N and O.

7. The composite material set forth in claim 1, wherein said substrate is a sintered article obtained by high-pressure sintering a mixture comprising 30 to 90% by volume of cubic boron nitride powder and the balance comprising a binder powder comprising at least one member selected from a group comprising nitride, carbide, boride and oxide of IVa, Va and VIa elements and their solid solutions and aluminum or an aluminum compound, and inevitable impurities.

8. The composite material set forth in claim 7, wherein said binder consists of 50 to 95% by weight of at least one member selected from a group comprising TiC, TiN, (Tim) C, (TiM) N and (TiM) CN, in which M is a transition metal selected from IVa, Va nd VIa elements except Ti, and 5 to 50% by weight of aluminum or an aluminum compound.

9. The composite material set forth in claim 8, wherein said binder consists of 50 to 80% by weight of $TiN_z$ in which $0.5 \leq z \geq 0.85$, 15 to 50% by weight of aluminum or an aluminum compound, and inevitable impurities, and the transverse rupture strength determined according to JIS standard of higher than 110 kgf/mm$^2$.

10. The composite material set forth in claim 8, wherein said binder consists of 50 to 80% by weight of $TiC_z$, in which $0.5 \leq z \geq 0.85$, 15 to 50% by weight of aluminum or an aluminum compound, and inevitable impurities, and the transverse rupture strength determined according to JIS standard of higher than 105 kgf/mm$^2$.

11. The composite material set forth in claim 1, wherein said substrate is a sintered article obtained by high-pressure sintering a mixture comprising 45 to 95% by volume of cubic boron nitride powder and the balance comprising a binder powder comprising at least one member selected from a group comprising Co, Ni, WC, TiN, TiC and solid solutions thereof, aluminum or an aluminum compound, and inevitable impurities.

12. The composite material set forth in claim 11, wherein said binder contains 1 to 50% by weight of TiN and at least one member selected from a group comprising Co, Ni and WC, aluminum or an aluminum compound, and inevitable impurities.

13. The composite material set forth in claim 11, wherein the powder has a particle size of less than 3 mm and a transverse rupture strength determined according to JIS standard of higher than 105 kgf/mm$^2$.

14. The composite material set forth in claim 1, wherein said substrate is a sintered article obtained by high-pressure sintering a mixture comprising more than 95% by volume of cubic boron nitride powder and the balance comprising a binder powder comprising a boride of Ia or IIa elements, TiN, and inevitable impurities.

15. The composite material set forth in claim 14, wherein said binder contains 1 to 50% by weight of TiN and boride of Ia or IIa elements.

16. The composite material set forth in claim 1, wherein said substrate is a sintered article obtained by high-pressure sintering a mixture comprising 50 to 98% by volume of diamond powder and the balance comprising a binder powder comprising iron group metal, WC and inevitable impurities.

17. The composite material set forth in claim 1, wherein said substrate is a sintered article obtained by high-pressure sintering a mixture comprising 60 to 95% by volume of diamond powder and the balance comprising a binder powder comprising iron group metal, at least one member selected from a group comprising carbide and carbonitride of IVa, Va and VIa element, WC, and inevitable impurities.

18. The composite material set forth in claim 14, wherein said binder comprises Co, TiC, WC and inevitable impurities.

19. The composite material set forth in claim 1, wherein said substrate is a sintered article obtained by high-pressure sintering a mixture comprising 60 to 98% by volume of diamond powder and the balance comprising a binder powder comprising silicon carbide, silicon, WC and inevitable impurities.

20. The composite material set forth in claim 16, wherein the transverse rupture strength determined according to JIS standard is higher than 150 kgf/mm$^2$.

21. The composite material set forth in claim 1, wherein said substrate is a sintered article obtained by high-pressure sintering a mixture comprising:
 (a) 45 to 95% by volume of cubic boron nitride powder and the balance comprising a binder powder comprising at least one member selected from a group comprising Co, Ni, WC, TiN, TiC and solid solutions thereof, aluminum or an aluminum compound, and inevitable impurities;
 (b) more than 95% by volume of cubic boron nitride powder and the balance comprising a binder powder comprising a boride of Ia or IIa elements, TiN, and inevitable impurities; and
 (c) 60 to 95% by volume of diamond powder and the balance comprising a binder powder comprising iron group metal, at least one member selected from a group comprising carbide and carbonitride of IVa, Va and VIa element, WC, and inevitable impurities.

22. The composite material set forth in claim 21, wherein the heat-resisting film has a hardness Hv higher than 2800.

* * * * *

UNITED STATES PATENT AND TRADEMARK OFFICE
CERTIFICATE OF CORRECTION

PATENT NO. : 5,853,873 Page 1 of 1
APPLICATION NO. : 08/549168
DATED : December 29, 1998
INVENTOR(S) : Satoru Kukino et al.

It is certified that error appears in the above-identified patent and that said Letters Patent is hereby corrected as shown below:

Column 12,
Line 66, delete "$0.3 \leq x \geq 0.5$" and replace it with -- $0.3 \leq x \leq 0.5$ --.

Column 13,
Lines 34 and 40, "$0.5 \leq z \geq 0.85$" and replace it with -- $0.5 \leq z \leq 0.85$ --.

Signed and Sealed this

Twentieth Day of June, 2006

JON W. DUDAS
*Director of the United States Patent and Trademark Office*